(12) United States Patent
Assel

(10) Patent No.: US 6,502,477 B1
(45) Date of Patent: Jan. 7, 2003

(54) CHANGE-SPEED LEVER FOR A BICYCLE GEAR

(75) Inventor: Martin Assel, Würzberg (DE)

(73) Assignee: Sram Deutschland GmbH, Schweinfurt (DE)

(*) Notice: Subject to any disclaimer, the term of this patent is extended or adjusted under 35 U.S.C. 154(b) by 0 days.

(21) Appl. No.: 09/700,788

(22) PCT Filed: Mar. 28, 2000

(86) PCT No.: PCT/EP00/02706
§ 371 (c)(1),
(2), (4) Date: Feb. 27, 2001

(87) PCT Pub. No.: WO00/59774
PCT Pub. Date: Oct. 12, 2000

(30) Foreign Application Priority Data

Apr. 3, 1999 (DE) .......................................... 199 15 336

(51) Int. Cl.⁷ ................................................ F16C 1/12
(52) U.S. Cl. ..................................................... 74/502.2
(58) Field of Search ............................. 74/501.6, 502.2

(56) References Cited

U.S. PATENT DOCUMENTS 5,682,794 A * 11/1997 Shibat ....................... 74/502.2
5,701,786 A * 12/1997 Kawakami ................. 74/502.2

FOREIGN PATENT DOCUMENTS

| DE | 19642907 | 4/1997 |
| EP | 0361335 | 4/1990 |
| EP | 0940334 | 9/1999 |

* cited by examiner

Primary Examiner—Chong H. Kim
(74) Attorney, Agent, or Firm—Liniak, Berenato & White

(57) ABSTRACT

A shift mechanism for a bicycle gear assembly that includes an actuating part that may be moved by an actuating lever or a release lever to shift between the gears of the gear assembly. The actuating and release levers operate independently from each other. The actuating part has a winding groove for receiving a cable connected to the gear assembly and first and second toothed segments. The release lever controls a detent element having first and second detent noses that are alternately engageable with the first and second toothed segments, respectively. The release lever may also have a cam contour that allows at least two gears to be shifted upon actuation of the release lever.

16 Claims, 4 Drawing Sheets

CHANGE-SPEED LEVER FOR A BICYCLE GEAR

BACKGROUND OF THE INVENTION

The invention relates to a shift mechanism for a bicycle gear assembly and in particular a shift mechanism that includes an actuating lever and a release lever that operate independently from each other to shift between the gears.

EP 0 352 733 B1 discloses a shift mechanism for a bicycle gear assembly that is a trigger shift mechanism, in which the tension cable can be wound up against the spring of the bicycle gear and released by a detent mechanism through the actuation of a single lever. This is achieved by an actuating lever rotatably mounted about a central axis to tension the tension cable. One detent device is traversed per shift step. A release lever is actuated to cause the actuating lever to be pulled back by the tension cable into the next detent stage for the next gear ratio. The release lever is an integral part of the actuating lever. The release lever being operated in a plane perpendicular to the plane of operation of the actuating lever. The pivot for the release lever is integrated into the actuating lever and, as the individual gear ratios are selected, corotates about the central axis of the actuating lever. A drawback associated with this configuration is that in the extreme positions of the shift mechanism, between the hill-climbing gears and the speed gears, the actuating lever is located in an area which is ergonomically unfavorable.

French Patent FR 2 701 917 (93 02255) discloses a release lever and an actuating lever that are arranged in two parallel planes of action. This configuration allows an actuating part to be turned by the actuating lever about a common central axis, while the release lever resets the part, gear ratio by gear ratio by means of a toothed rocker bar. The manner in which the rocker bar engages the toothing on the actuating part is similar to a toothed rocker bar in a mechanical clock, which is actuated by a balance.

SUMMARY OF THE INVENTION

This invention combines the features of EP 352 733 with the features of FR 2 701 917 inasmuch as a release lever engages a first toothed segment and a release lever acts on a second toothed segment. The release lever and an actuating lever acting in planes that are parallel to one another. The two toothed segments are connected by a detent element designed as a rocker and having detent noses that can alternately engage in one set of toothing of the toothed segments or the other. The detent element is controlled by the release lever. The release lever has a cam contour connected to the detent element by means of an extension. The detent element engages repeatedly and alternately the toothing of the two toothed segments when the release lever is actuated in one direction. The detent element is spring-loaded toward the toothed segment on the actuating lever and thus the detent element is in its rest position when it is engaged with this toothed segment. When the first toothed segment is turned by the actuating lever, the detent element slides over the toothed segment, and the extension of the detent element is released from the cam contour of the release lever without performing an action.

A tension cable, which is wound up by the rotation of the toothed segment by means of the actuating lever, changes gear ratios in the bicycle gear and simultaneously tensions the cable against a spring in the bicycle gear. This tensioning can take place from the first to the last gear ratio. The release lever relaxes the cable and the toothed segments are moved back tooth by tooth, gear ratio by gear ratio. During this process, the release lever's cam contour, which comprises a rising cam part and a falling cam part, first moves the detent element into a position of engagement and then out of a position of engagement with the toothed segment. If the release lever is released, the extension on the detent element moves backward over the cam contour and a second gear change is performed. The cam contour may be extended to provide a plurality of rising and falling cam parts. This means that a plurality of gears can be shifted in a forward movement of the release lever, an equal number of gear change operations being added during the return of the release lever. Since the actuating lever is connected to the first toothed segment by a pawl, the actuating part is moved by the actuation of the release lever, this movement by the pawl being decoupled from the actuating lever.

It is therefore the object of the invention to create a shift mechanism for actuating a bicycle gear assembly which is designed as a trigger shift mechanism and can actuate a cable to shift one or more gear ratios not just in a direction of rotation corresponding to the winding up of the cable but can also shift via at least one but also via a plurality of gear ratios in a direction of rotation corresponding to the unwinding of the cable through the release of the cable.

BRIEF DESCRIPTION OF THE DRAWINGS

The solution is described in the characterizing part of the main claim and in the subclaims. A shift mechanism having the features described in the statement of the object will be explained with reference to a number of drawings, in which:

DETAILED DESCRIPTION OF THE INVENTION

Figure 1:
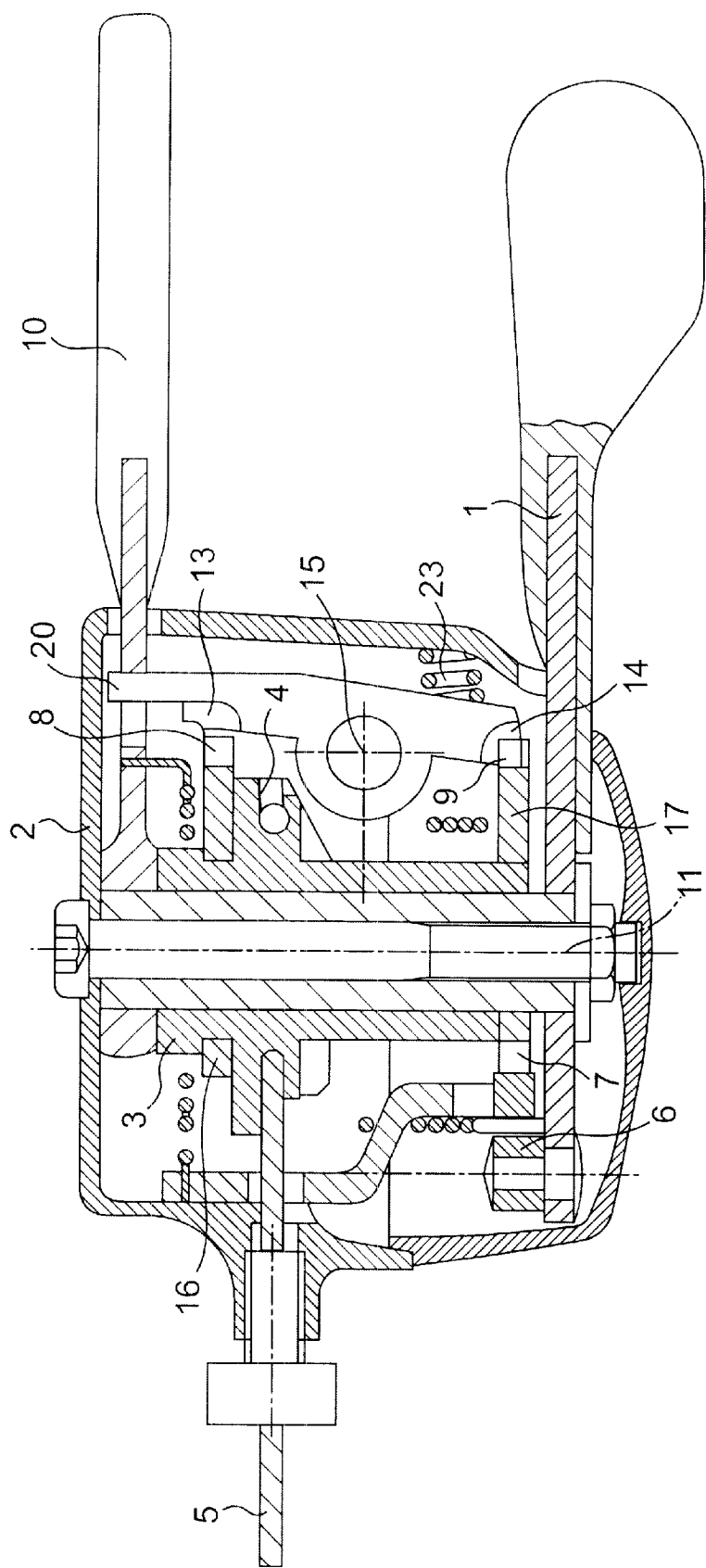
FIG. 1 shows a shift mechanism for a bicycle, having a housing, an actuating lever and a release lever, and a detent element actuated by the release lever.

The invention describes a bicycle gear shift mechanism that can be arranged on bicycle handlebars and controls a bicycle gear assembly. According to FIG. 1, the shift mechanism includes a housing 2 with an actuating part 3 that can be moved by an actuating lever 1 and by a release lever 10. The actuating part 3 has a winding groove 4 for a tension cable 5, which is connected to the bicycle gear assembly and is kept under tension by a spring located there. The actuating part 3 has a first detent disk 16 with a first toothed segment 8 and a second detent disk 17 with a second toothed segment 9. The actuating part 3 having a configuration such that it can rotate about a central axis 11 with the first detent disk 16 and the second detent disk 17. The actuating part 3 can be turned by the actuating lever 1 by means of a pawl 6, which engages in toothing 7 connected rotationally to the actuating part 3. When the actuating lever 1 is moved, this movement is transmitted to the actuating part 3 by the pawl 6, resulting in the cable 5 being wound onto the winding groove 4, and thereby tensioning the spring and changing gear ratios in the bicycle gear assembly.

Figure 2:
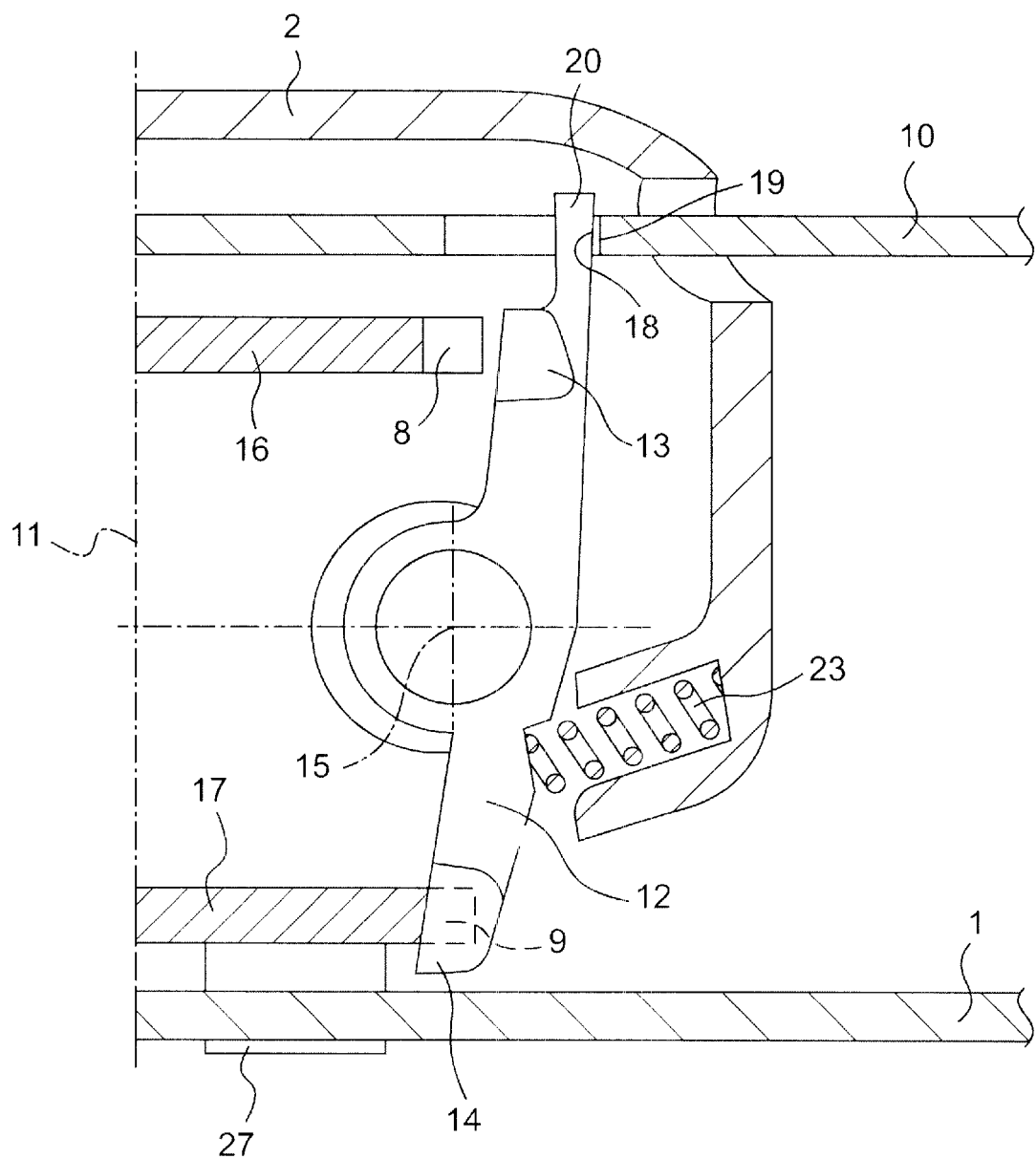
FIG. 2 shows the shift mechanism, having an actuating part and two toothed segments, into which the detent element actuated by the release lever engages.

FIG. 2 shows a play-free trigger device in the form of a detent element 12 having a first detent nose 13 and a second detent nose 14. The detent element 12 is arranged pivotably on a pivot 15 fixed in relation to the housing. The first detent nose 13 engages the first toothed segment 8 and the second detent nose 14 engages the second toothed segment 9 alternatively. The detent element 12 is supported against the housing by a spring 23 and interacts by means of the second detent nose 14 with the second toothed segment 9 of the second detent disk 17 in the state of rest, thereby ensuring that, once a gear ratio has been selected in the bicycle gear assembly, it is retained. The detent element 12 has an extension 20 that interacts with a cam contour 19 in the release lever 10. The extension 20 is held in continuous contact with an edge 18 by the spring 23 and, when the release lever 10 is actuated, the extension 20 slides on the cam contour 19, resulting in the detent element 12 performing a rocking motion causing the second detent nose 14 and the first detent nose 13 to alternately engage the second toothed segment 9 and the first toothed segment 8, respectively.

Figure 3:
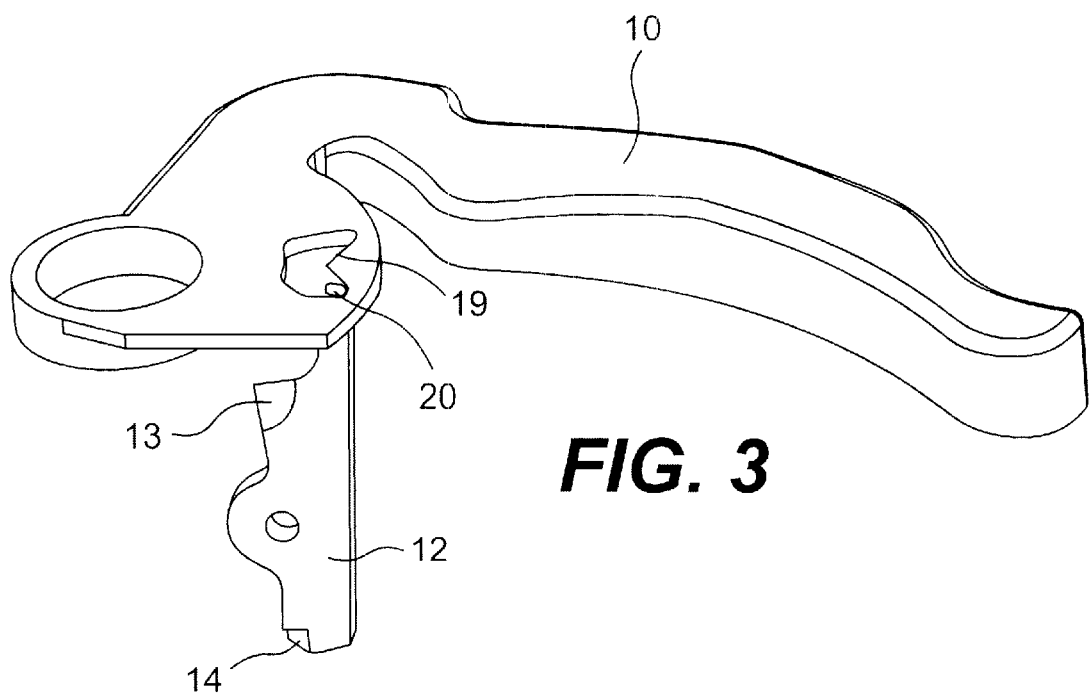
FIG. 3 shows the release lever with a cam contour for the actuation of the detent element.
Figure 4:
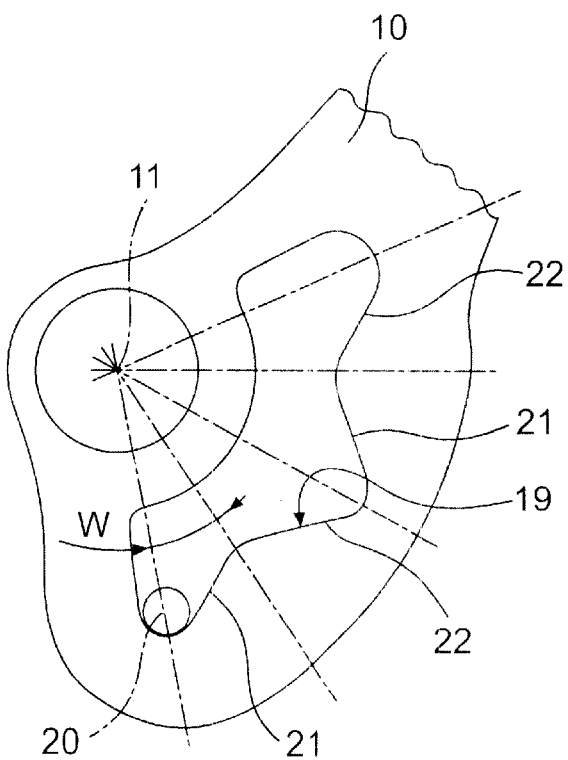
FIG. 4 shows the cam contour in the release lever with a plurality of rising and falling cam parts.

Referring to FIGS. 3 and 4, the cam contour 19 has at least one rising cam part 21 and one falling cam part 22, along which the extension 20 must slide. To release the cable 5 to shift between gear ratios, the release lever 10 is actuated to disengage the retaining connection between the second detent nose 14 and the second toothed segment 9, resulting in the actuating part being turned by the cable in the winding grove 4 which is being pulled back gear ratio by gear ratio by the spring situated on the bicycle gear. In this case, the extension 20 of the detent element 12 runs up onto the rising cam part 21 of the cam contour 19, the release lever 10 has turned through a partial angle W and the first detent nose 13 has entered into engagement with the first toothed segment 8. When the cable 5 has been released from the winding groove 4 by about half a gear ratio; the second half of the gear ratio is traversed by virtue of the fact that, in accordance with FIG. 3, the extension moves back on the falling cam part 22 into its original position, provided that the release lever 10 is turned by a further partial angle W.

In trigger shift mechanisms, all the levers return to their starting position through spring force once shifting of the gear ratios in the bicycle gear has been completed, which means that the release lever 10 shown in FIG. 3 can shift a maximum of two gear ratios with its cam contour 19 in the direction of rotation corresponding to the unwinding of the cable. If only one gear ratio is to be shifted, it is sufficient to turn the release lever 10 merely through a partial angle W until the extension 20 has reached the end of the rising cam part. If the release lever 10 is then released, it returns to its starting position, and the extension 20 returns to its original position. Since, in accordance with FIG. 4, the cam contour 19 has four partial angles W, i.e. two rising cam parts 21 and two falling cam parts 22, it is possible to shift a maximum of 4 gears if the release lever 10 is turned until the extension 20 has traversed all cam parts 21 and 22 in both directions. To make it easier to shift the gear ratios in the bicycle gear assembly, a detent can be built into the release lever 10, making it easier for the rider to find the individual end points for the travel of the release lever 10 for the planned gear ratios.

Figure 5:
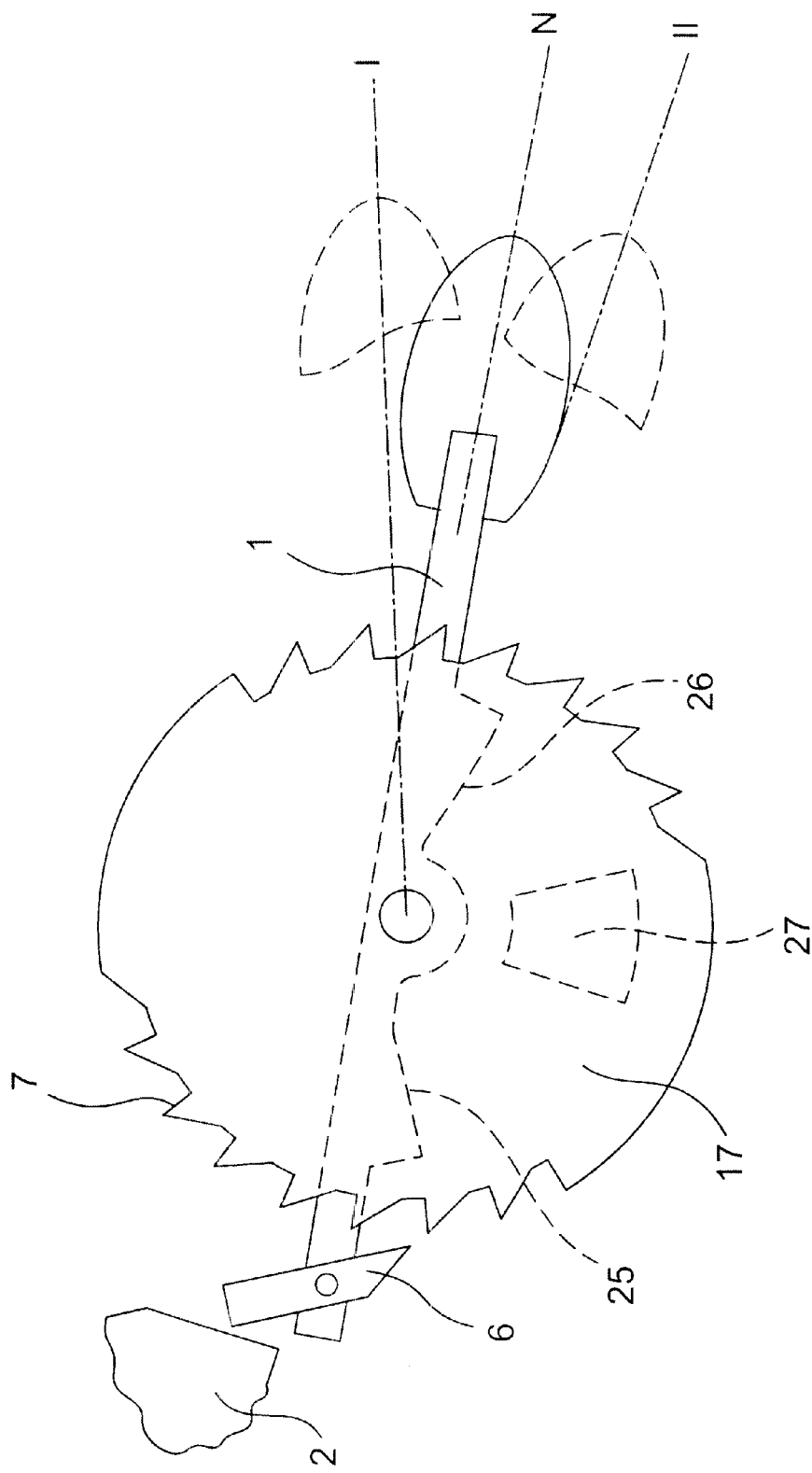
FIG. 5 shows the actuating lever with a pawl that can be operated on the housing side and is intended to interact with toothing on a second detent disk.

FIG. 5 shows an actuating lever 1, which, in the position indicated, occupies a rest position N as long as the first and last gear ratios of the bicycle gear are not selected. Arranged on the second detent disk 17 or actuating part 3 is a stop extension 27, which interacts with a first stop 25 and a second stop 26 on the actuating lever 1 when the first gear ratio or last gear ratio is selected in the bicycle gear. Assuming that the first gear ratio is selected when the stop extension 27 has been turned into the outermost position counter to the direction of rotation, the first stop 26 is designed such that the actuating lever 1 can no longer return to its rest position N and remains in a rest position I of the first gear ratio. Such a measure indicates to the rider by feel that all the gear ratios have been traversed and that the first gear ratio has been reached. It should likewise be communicated to the rider by feel that shifting further would be pointless through a rest position II of the last gear ratio. This is achieved by virtue of the fact that the stop extension 27 runs clockwise against the first stop 25, thereby preventing the actuating lever 1 from returning to the rest position N.

The advantage of the present invention is that it is possible to shift through the gear ratios of the bicycle gears both with the actuating lever 1 and with the release lever 10. The detent element 12 of both levers 1 and 10 being decoupled such that the movements of one lever 1 or 10 are not transmitted to the other lever 1 or 10 while the trigger principle, namely the ability to select individual gear ratios, is maintained and both levers 1, 10 always return to their respective initial positions. The present invention also allows the first and the last gear ratios to occupy rest positions I and II that are different from the normal rest position N in order to indicate the end points of the shift steps to the rider by feel without the need to make visual contact with a gear display.

What is claimed is:

1. A shift mechanism for a bicycle gear assembly, comprising:
   a housing having an axis;
   an actuating lever rotatable about the axis;
   an actuating part rotatable about the axis and having a winding groove for receiving a tension cable, the actuating part having a toothing;
   a pawl engageable with the toothing on the actuating part to wind up the tension cable;
   first and second toothed segments connected to the actuating part;
   a detent element having a first detent nose and a second detent nose, the first detent nose engageable with the first toothed segment and the second detent nose engageable with the second toothed segment such that when one of the first and second detent noses is disengaged from the toothed segment, the actuating part is turned by tensile force of the tension cable; and
   a release lever operatively connected to the detent element for controlling the detent element.

2. The shift mechanism as claimed in claim 1, wherein the detent element is pivotably mounted on a pivot fixed in relation to the housing and substantially perpendicular to the axis.

3. The shift mechanism as claimed in claim 2, wherein the pivot is located a distance from the axis that substantially equals radii of the first and second toothed segments.

4. The shift mechanism as claimed in claim 2, wherein the pivot is approximately centrally located between the first toothed segment and the second toothed segment.

5. The shift mechanism as claimed in claim 1, wherein the detent element is spring-loaded relative to the housing toward engagement with the second toothed segment.

6. The shift mechanism as claimed in claim 1, wherein the first toothed segment is rotationally connected to the actuating part by a first detent disk, and the second toothed segment is rotationally connected to the actuating part by a second detent risk.

7. A shift mechanism for a bicycle gear assembly, comprising:
- a housing having an axis;
- an actuating lever rotatable about the axis;
- an actuating part disposed in the housing and rotatable about the axis, the actuating part having toothing and a winding groove for receiving a tension cable;
- a pawl engageable with toothing on the actuating part to wind up the tension cable;
- first and second toothed segments are connected to the actuating part;
- a detent element engageable with the first and second toothed segment; and
- a release lever operatively connected to the detent element, the release lever having a cam contour having at least one rising cam part and one falling cam part to allow at least two gear ratios to be shifted upon actuating the release lever, while the detent element engages the cam contour.

8. The shift mechanism as claimed in claim 7, wherein the detent element includes a first detent nose engageable with the first toothed segment and a second detent nose engageable with the second toothed segment, and engages the release lever such that, when the release lever is actuated, the detent element performs a rocking motion, during which, in succession, a first detent nose, on the one hand, comes into engagement with the first toothed segment, and a second detent nose, on the other hand, comes into engagement with the second toothed segment.

9. The shift mechanism as claimed in claim 7, wherein the detent element has an edge that engages the cam contour on the release lever.

10. The shift mechanism as claimed in claim 9, wherein the edge is part of an extension on the detent element.

11. The shift mechanism as claimed in claim 7, wherein the release lever is designed as a trigger lever that returns to a rest position (N) through the restoring force of a spring after each actuation.

12. The shift mechanism as claimed in claim 1, wherein the pawl is pivotably mounted on the actuating lever for engaging the toothing connected to the actuating part.

13. The shift mechanism as claimed in claim 12, wherein the first toothed segment is rotationally connected to the actuating part by a first detent disk, and the second toothed segment is rotationally connected to the actuating part by a second detent disk and the toothing is connected to one of the first and second detent disks.

14. The shift mechanism as claimed in claim 13, wherein the toothing is integrally connected to the second detent disk.

15. The shift mechanism as claimed in claim 12, wherein the pawl is out of engagement with the toothing in the rest position of the actuating lever.

16. A shift mechanism for a bicycle gear assembly, comprising:
- a housing having an axis;
- an actuating lever rotatable about the axis;
- an actuating part rotatable about the axis, the actuating part having toothing and a winding groove for receiving a tension cable, the actuating lever controlling the actuating part;
- a pawl engageable with toothing on the actuating part to wind up the tension cable;
- first and second toothed segments connected to the actuating part; and
- a release lever alternately engageable with the first toothed segment and the second toothed segment,
- the actuating lever having, relative to the actuating part, at least one stop engageable with a stop extension when a first or a last gear ratio is reached, thereby distinguishing the rest position (I) of the actuating lever in the first gear ratio and/or the rest position (II) of the actuating lever in the last gear ratio from the normal rest position (N) of the actuating lever in the remaining gear ratios.

\* \* \* \* \*

(12) INTER PARTES REEXAMINATION CERTIFICATE (0085th)

United States Patent
Assel

(10) Number: US 6,502,477 C1
(45) Certificate Issued: Aug. 4, 2009

(54) CHANGE-SPEED LEVER FOR A BICYCLE GEAR

(75) Inventor: Martin Assel, Würzberg (DE)

(73) Assignee: SRAM Deutschland GmbH, Schweinfurt (DE)

Reexamination Request:
No. 95/000,012, May 8, 2003

Reexamination Certificate for:
Patent No.: 6,502,477
Issued: Jan. 7, 2003
Appl. No.: 09/700,788
Filed: Feb. 27, 2001

(22) PCT Filed: Mar. 28, 2000

(86) PCT No.: PCT/EP00/02706

§ 371 (c)(1),
(2), (4) Date: Feb. 27, 2001

(87) PCT Pub. No.: WO00/59774

PCT Pub. Date: Oct. 12, 2000

(30) Foreign Application Priority Data

Apr. 3, 1999 (DE) .......................................... 199 15 336

(51) Int. Cl.
*F16C 1/10* (2006.01)

(52) U.S. Cl. ..................................................... 74/502.2

(58) Field of Classification Search .................. 74/502.2, 74/488, 489, 501.6
See application file for complete search history.

(56) References Cited

U.S. PATENT DOCUMENTS

| | | | |
|---|---|---|---|
| 5,012,692 A | | 5/1991 | Nagano |
| 5,213,005 A | * | 5/1993 | Nagano ..................... 74/502.2 |
| 5,730,030 A | | 3/1998 | Masui |
| 5,791,195 A | * | 8/1998 | Campagnolo ............. 74/489 X |
| 5,921,138 A | * | 7/1999 | Kojima et al. ............ 74/473.13 |
| 5,957,002 A | * | 9/1999 | Ueng ....................... 74/502.2 |
| 6,155,132 A | * | 12/2000 | Yamane ................... 74/502.2 |

OTHER PUBLICATIONS

Merriam Webster's Collegiate Dictionary, Tenth Edition, 1999, p. 1067.*

* cited by examiner

*Primary Examiner*—Vinh T. Luong

(57) ABSTRACT

A shift mechanism for a bicycle gear assembly that includes an actuating part that may be moved by an actuating lever or a release lever to shift between the gears of the gear assembly. The actuating and release levers operate independently from each other. The actuating part has a winding groove for receiving a cable connected to the gear assembly and first and second toothed segments. The release lever controls a detent element having first and second detent noses that are alternately engageable with the first and second toothed segments, respectively. The release lever may also have a cam contour that allows at least two gears to be shifted upon actuation of the release lever.

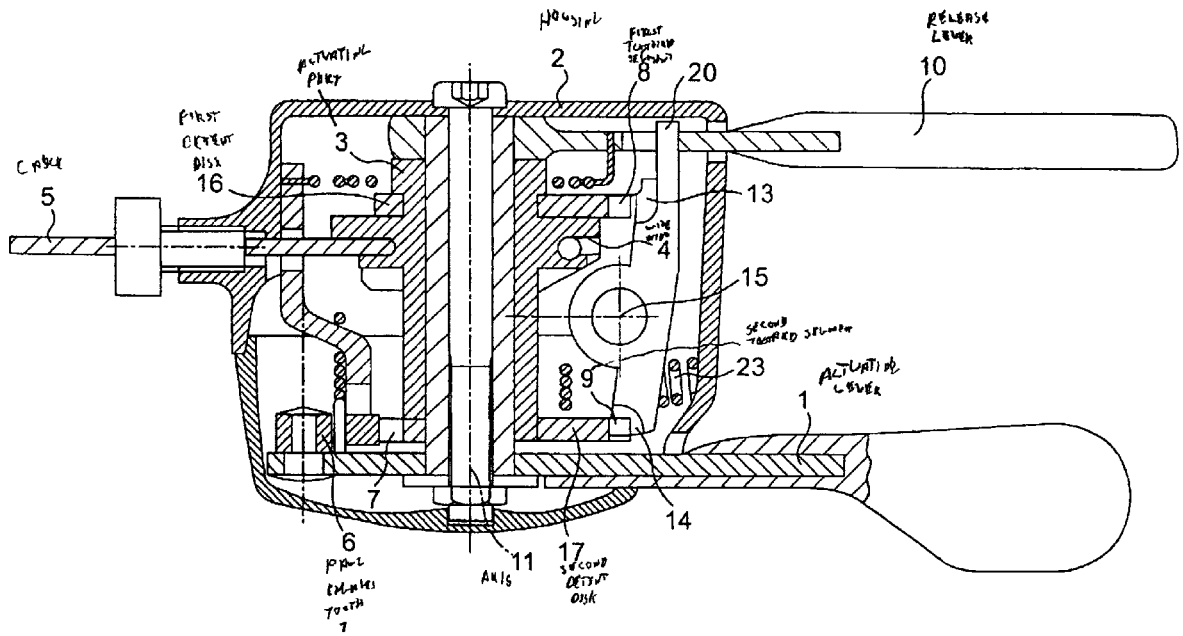

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 7–11 and 16 is confirmed.

Claim 1 is determined to be patentable as amended.

Claims 2–6 and 12–15, dependent on an amended claim, are determined to be patentable.

1. A shift mechanism for a bicycle gear assembly, comprising:

a housing having an axis;

an actuating lever rotatable about the axis;

an actuating part rotatable about the axis and having a winding groove for receiving a tension cable, the actuating part having a toothing;

a pawl engageable with the toothing on the actuating part to wind up the tension cable;

first and second toothed segments connected to the actuating part, *the first toothed segment having a first plurality of teeth, the second toothed segment having a second plurality of teeth separate from the first plurality of teeth*;

a *one-piece* detent element having a first detent nose and a second detent nose, the first detent nose engageable with the first toothed segment and the second detent nose engageable with the second toothed segment such that when one of the first and second detent noses is disengaged from the toothed segment, the actuating part is turned by tensile force of the tension cable; and a release lever operatively connected to the detent element for controlling the detent element.

\* \* \* \* \*